US008483657B2

(12) United States Patent
Asawa et al.

(10) Patent No.: US 8,483,657 B2
(45) Date of Patent: Jul. 9, 2013

(54) DISSEMINATION OF BILLING INFORMATION IN A DISTRIBUTED MESSAGING ENVIRONMENT

(75) Inventors: Manjari Asawa, Cupertino, CA (US); Bradley D. Cooper, Orchard Lake, MI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 803 days.

(21) Appl. No.: 12/435,135

(22) Filed: May 4, 2009

(65) Prior Publication Data

US 2010/0279650 A1     Nov. 4, 2010

(51) Int. Cl.
*H04M 11/00*     (2006.01)
*H04W 4/00*     (2009.01)

(52) U.S. Cl.
USPC .......................................... 455/406; 455/466

(58) Field of Classification Search
USPC .............. 455/406, 407, 408, 466, 414, 432.1, 455/405, 409, 414.1, 414.3; 705/40; 379/91.01, 379/91.02, 114.01, 114.03, 114.05, 114.1, 379/114.18, 114.21, 114.26, 127.03
See application file for complete search history.

(56) References Cited

U.S. PATENT DOCUMENTS

| 6,473,622 | B1 * | 10/2002 | Meuronen | 455/466 |
| 8,014,800 | B2 * | 9/2011 | Tornkvist | 455/466 |
| 2005/0216403 | A1 * | 9/2005 | Tam et al. | 705/40 |
| 2005/0260993 | A1 * | 11/2005 | Lovell | 455/445 |
| 2007/0124452 | A1 * | 5/2007 | Mohammed | 709/223 |

* cited by examiner

*Primary Examiner* — George Eng
*Assistant Examiner* — Hung Du

(57) ABSTRACT

A messaging system for a wireless network may be constructed using a gateway architecture in which a number of messaging servers are connected to external networks through the gateway. In one implementation, a method implemented in the system may include receiving a message that is communicated as part of a messaging protocol for delivering text or multimedia messages to user devices and altering the message to include a billing identifier describing how the message should be billed. The message may be altered by the gateway and may be transmitted to a messaging server for extraction of the billing information.

22 Claims, 8 Drawing Sheets

| SHORT CODE | DESTINATION | BILLING ID |
|---|---|---|
| 123 | mms.aggregator1.com | 10 |
| 001 | sms.aggregaror2.com | 15 |
| ... | ... | ... |

| DESTINATION | BILLING ID |
|---|---|
| 703 555 XXXX | 10 |
| 011 91 XXXXXXXX | 15 |
| ... | ... |

DISSEMINATION OF BILLING INFORMATION IN A DISTRIBUTED MESSAGING ENVIRONMENT

BACKGROUND

Wireless service providers maintain networks through which users of mobile devices (e.g., cell phones) can wirelessly connect and communicate. Traditionally, mobile devices were used to enable voice communication with users of other mobile devices or to the "wired" telephone network. More recently, other services, such as the ability to send messages, such as text messages or multimedia messages, have also been introduced.

Wireless service providers may track and bill for the use of messaging services separately from traditional voice services. For instance, for text messages, subscribers may be charged for each message sent and/or received or subscribers may be allotted a predetermined number of free messages each month, after which they may be charged per message. It may be desirable that the messaging system used by the wireless service provider be flexible enough to provide the functionality required by the provider while also being scalable to accommodate capacity changes in the messaging system.

BRIEF DESCRIPTION OF THE DRAWINGS

FIGS. 4A and 4B are diagrams illustrating exemplary data structures that may be used by the SMPP gateway and/or the MMSC gateway shown in FIG. 1;

DETAILED DESCRIPTION OF PREFERRED EMBODIMENTS

The following detailed description refers to the accompanying drawings. The same reference numbers in different drawings may identify the same or similar elements. Also, the following description does not limit the invention.

Concepts described herein relate to a messaging system for a wireless network. The messaging system may be constructed using a gateway architecture in which a number of messaging servers are connected to external networks through the gateway. Billing information may be transmitted from the gateway to the messaging servers in a new or unassigned field that is inserted into messages that are normally exchanged as part of the messaging protocol. Extending the messaging protocol to include the billing information may preserve the advantage of a centralized architecture for storing billing and routing information while at the same time offering advantages of the distributed messaging architecture.

Figure 1:
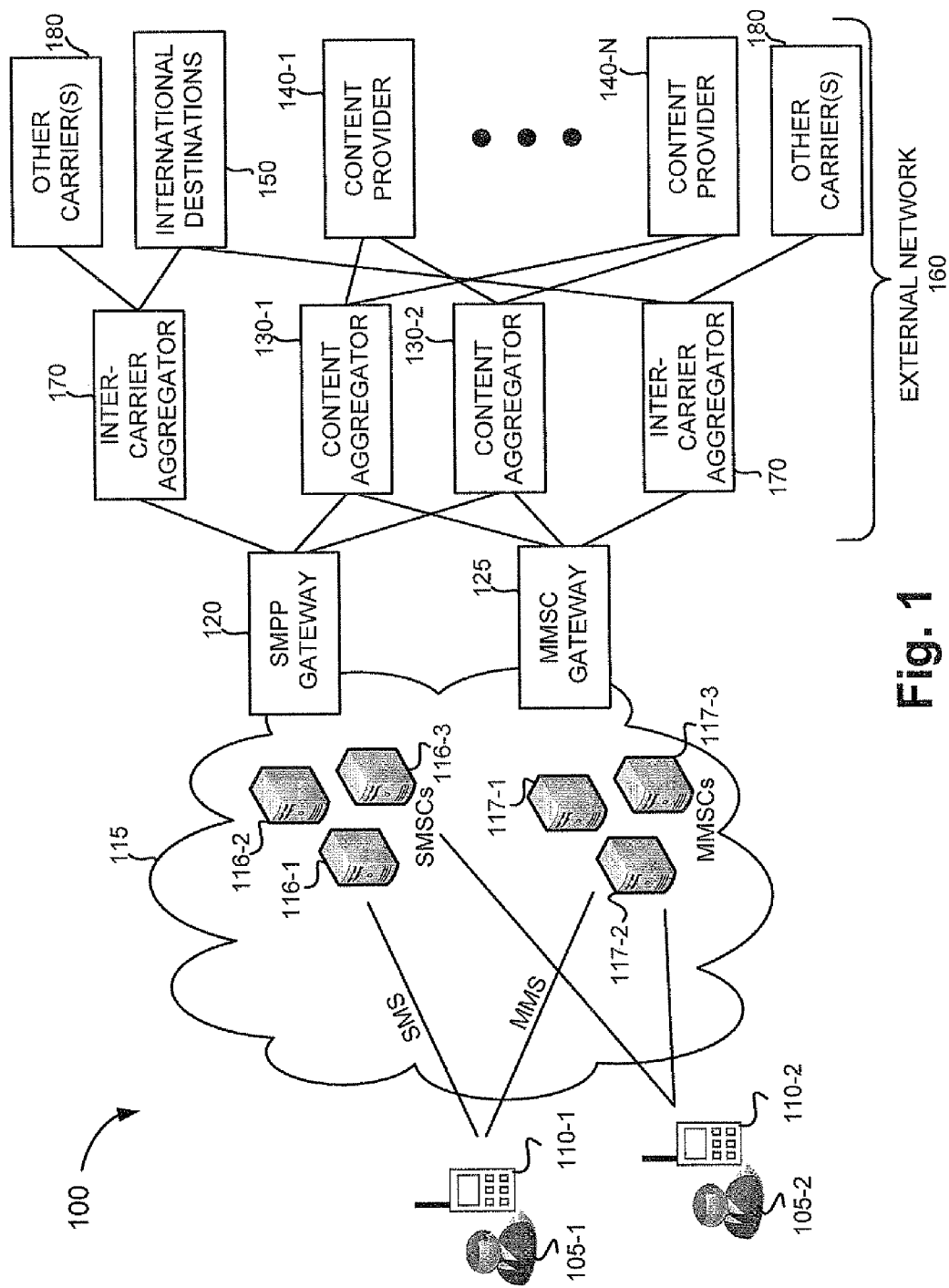
FIG. 1 is a diagram of an exemplary system in which a messaging system may be implemented.

FIG. 1 is a diagram of an exemplary system 100 in which a messaging system may be implemented. As illustrated, FIG. 1 includes users 105-1 and 105-2, mobile devices 110-1 and 110-2, a service provider network 115, a Short Message Peer-to-Peer (SMPP) gateway 120, and a Multimedia Message Service Center (MMSC) gateway 125. SMPP 120 and MMSC 125 may connect to an external network 160, which may include, among other things, one or more content aggregators, labeled as content aggregators 130-1 and 130-2 (collectively, content aggregators 130), which may further connect to a plurality of content providers 140-1 through 140-N (collectively, content providers 140) or to other destinations, such as international destinations 150. External network 160 may also include one or more intercarrier aggregators 170, which may connect to other carriers 180. Inter-carrier aggregators 170 may act as a gateway through which SMS or MMS messages may be exchanged between users of different carriers.

System 100 may generally be used to exchange messages between users 105 or between one of users 105 and one of content providers 140. The messages may be, for example, text messages sent using the Simple Message Service (SMS) protocol or multimedia messages sent using the Multimedia Message Service (MMS) protocol. The term "messages" will be used herein to refer generally to an SMS message, an MMS message, or a similar type of message delivered using a protocol other than that used to deliver SMS or MMS messages. Service provider network 115 may represent the network associated with a particular wireless service provider. Messages sent between different users of the service provider may stay within network 115 while messages sent to (or received from) other users or devices (i.e., content providers 140) may traverse either SMPP gateway 120 or MMSC gateway 125 and be delivered over external network 160.

Users 105 may include subscribers of the wireless service provider that controls network 115. Users may access network 115 through communication devices, such as mobile devices 110, which may include any mobile telecommunication devices, such as, for example, mobile telephones, personal digital assistants, or laptop computers.

Service provider network 115 may include a network that is generally controlled by the service provider that provides wireless access to users 105. Network 115 may include, for example, cellular access sites and corresponding control equipment. As particularly shown in FIG. 1, network 115 may include multiple Short Message Service Centers (SMSCs) 116-1 through 116-3 and Multimedia Message Service Centers (MMSCs) 117-1 through 117-3. SMSCs 116 and MMSCs 117 may generally be referred to herein as messaging servers.

Each SMSC 116 may include a server device that supports SMS connectivity and processes SMS messages. SMSCs 117 may route SMS messages to users 105 or SMPP gateway 120. SMSC 117 may operate according to a store-and-forward framework that delivers SMS messages to recipients based on the status of user devices 105. SMSCs 116 may support person-to-person SMS messaging, and/or application-to-person and person-to-application SMS messaging. SMSCs 116 may also handle the storage of other information for users 105, such as billing or usage information describing the number of sent or received SMS messages and charges associated with each of the sent or received messages. In one implementation, each SMSC 116 may be associated with a particular user 105. For instance, all SMS messages sent by user 105-1 may be processed by SMSC 116-1.

Each MMSC 117 may include a server device that supports MMS connectivity and processes MMS messages. MMSCs 117 may route MMS messages to users 105 or MMSC gateway 125. MMSCs 117 may operate according to a store-and-forward framework that delivers MMS messages to recipients based on the status of user devices 105. MMSCs 117 may support person-to-person MMS messaging, and/or application-to-person and person-to-application MMS messaging. MMSCs 117 may also handle the storage of other information for users 105, such as billing or usage information describing the number of sent or received MMS messages and charges associated with each of the sent or received messages. In one implementation, each MMSC 117 may be associated with a particular user 105. For instance, all MMS messages sent by user 105-1 may be processed by MMSC 117-1.

SMPP gateway 120 may act as a gateway for SMS messages inbound to SMSCs 116 or outbound to external network 160. In general, SMPP gateway 120 may receive outbound SMS request messages from SMSCs and forward them to content aggregators 130, content providers 140, and/or intercarrier aggregators 170 (for transmission to other 180). SMPP 120 may then receive back acknowledgements and forward them to the sending SMSC 116. SMPP gateway 120 may similarly receive SMS request messages from an external source (e.g., a content aggregator 130, content provider 140, intercarrier aggregators 170 or other carriers) and forward the SMS request to the appropriate SMSC 116. SMPP gateway 120 may then receive back acknowledgements and forward them to the sending external source. SMPP gateway 120 may also substitute user entered short codes for actual destination addresses and direct internationally bound messages to international destinations 150.

MMSC gateway 125 may act as a gateway for MMS messages inbound to MMSCs 117 or outbound to external network 160. MMSC gateway 125 may function similar to SMPP gateway 120, except in the content of the delivery of MMS messages instead of SMS messages.

Content aggregators 130 may represent routing or aggregation points in external network 160, through which MMS and SMS messages may be routed. Content aggregators 130 may include devices that provide or aggregate content (e.g., news, logos, ring tones, podcasts, blogs, etc) from various service content providers 140.

Content providers 140 may represent other sources from which SMS or MMS messages may be generated or received. Content providers 140 may represent servers controlled by a commercial entity that provides services to users 105 via SMS or MMS messages. For example, one of servers 140, such as server 140-1, may, in response to a user request, send an SMS message to the user including some requested information (e.g., airline status, a weather forecast, a desired phone number, search results in response to a search query, etc.). Content providers 140 may also include other users, such as users that subscribe to a different wireless service provider than the one that manages network 115.

Intercarrier aggregators 170 may represent messaging hubs used to facilitate routing of SMS or MMS messages to customers of other wireless telephone providers (carriers). Other carriers 180 may represent the networks of the other wireless telephone providers. Intercarrier aggregators 170 and other carriers 180 may collectively function to provide, from the users perspective, a single messaging platform so that a user can send a SMS or MMS message to any other wireless user even if two users are using different wireless carriers for their wireless service.

International destinations 150 may represent destinations associated with international content providers (or international subscribers to other networks). SMS or MMS messages that are intended for international destinations may be routed to a network implemented at the international destination. Similarly, SMS or MMS messages may be sent by the international destination and transmitted to users 105.

System 100 may support short codes. Short codes are telephone numbers that may be significantly shorter than full telephone numbers. Short codes are frequently used to address SMS and MMS messages from mobile phones. Short codes are widely used for value-added services such as television voting, ordering ringtones, charity donations and other mobile services. Short codes can be used in mobile networks because telephone numbers dialed in mobile networks are typically sent as a single message to the network, allowing the mobile network to unambiguously determine the end of the dialed number even if the set of allowable numbers do not have a fixed length.

Although FIG. 1 illustrates an exemplary system 100, in other implementations, system 100 may include additional, fewer, or different devices and/or networks. Additionally, or alternatively, the number of devices, the arrangement of the devices and/or the connections illustrated may be different in other implementations. Additionally, or alternatively, it will be appreciated that one or more devices in system 100 may be capable of performing one or more functions, operations, etc., that have been described as being performed by one or more other devices in system 100.

Figure 2:
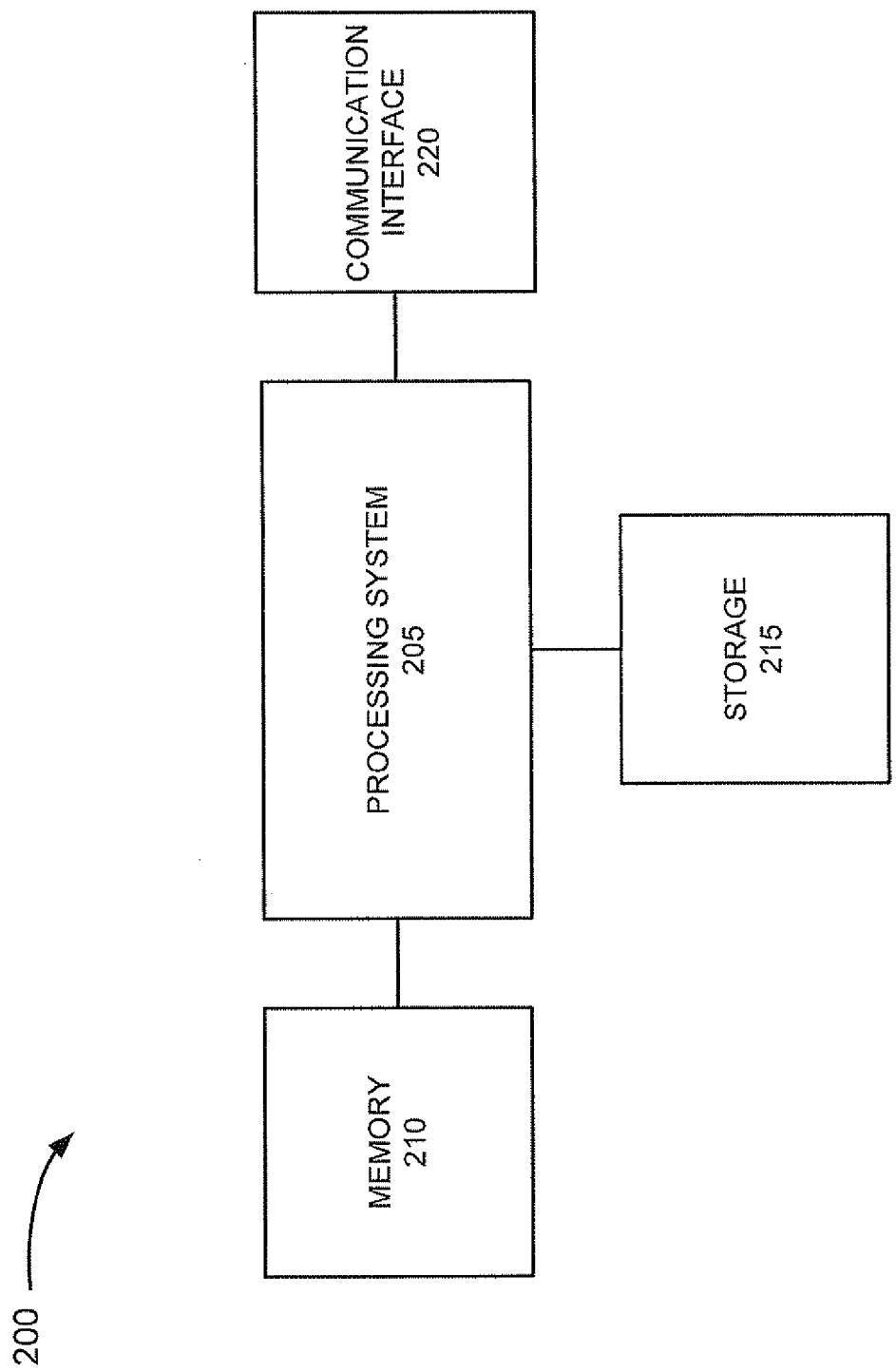
FIG. 2 is a diagram illustrating exemplary components of devices in FIG. 1.

FIG. 2 is a diagram illustrating exemplary components of a device 200 that may correspond to an SMSC 116, an MMSC 117, an SMPP gateway 120, an MMSC gateway 125, or content aggregator 140. As illustrated, device 200 may include a processing system 205, memory 210, storage 215, and a communication interface 220.

Processing system 205 may interpret and/or execute instructions and/or data. For example, processing system 205 may include a general-purpose processor, a microprocessor, a data processor, a co-processor, a network processor, an application specific integrated circuit (ASIC), a controller, a programmable logic device, a chipset, a field programmable gate array (FPGA), or some other component that may interpret and/or execute instructions and/or data.

Memory 210 may store data, an application, and/or instructions related to the operation and use of device 200. For example, device 200 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 215 may store data, an application and/or instructions related to the operation and use of device 200. For example, storage 215 may include a hard disk (e.g., a magnetic disk, an optical disk, a magneto-optic disk, etc.) or another type of computer-readable medium, along with a corresponding drive. Memory 210 and/or storage 215 may also include a storing device external to and/or removable from device 200, such as a Universal Serial Bus (USB) memory stick, a hard disk, etc.

Communication interface 220 may enable device 200 to communicate with other components and/or systems. For example, communication interface 220 may include an Ethernet interface, an optical interface, a coaxial interface, a wireless interface, or the like that permit device 200 to communicate with other devices in system 100.

Although FIG. 2 illustrates exemplary components of device 200, in other implementations, device 200 may include fewer, additional, and/or different components than those depicted in FIG. 2.

The system shown in FIG. 1 illustrates a gateway architecture for implementing SMS and MMS messaging. The gateway messaging architecture may be characterized by a number of messaging servers (SMSCs 116 or MMSCs 117) connecting to external network 160 through a smaller number of gateways, such as SMPP gateway 120 or MMSC gateway 125. The illustrated gateway architecture can have the advantage that messages routed between users of the same wireless service provider (i.e., messages routed to end-points within network 115) do not need to be routed through the gateways 120 or 125 as well as reducing the number of systems to which entities from external network 160 need to connect.

Figure 3:
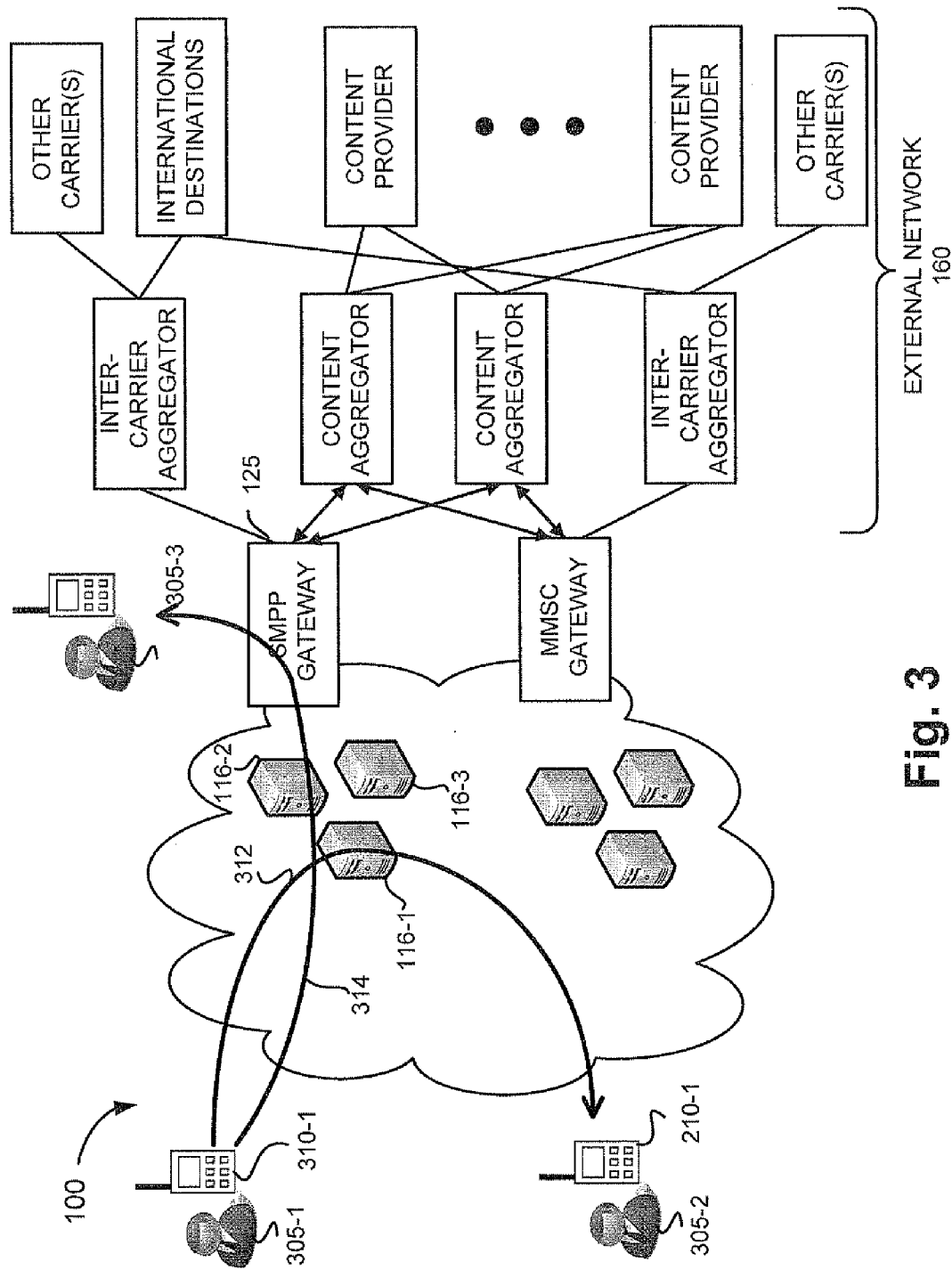
FIG. 3 is a diagram illustrating operation of an exemplary gateway messaging architecture for the system shown in FIG. 1.

FIG. 3 is a diagram illustrating operation of an exemplary gateway messaging architecture for system 100. Three users 305-1, 305-2, and 305-3 are shown, each communicating using a corresponding mobile device 310-1, 310-2, and 310-3, respectively. Assume that user 305-1 sends an SMS message 312 to user 305-2 and that users 305-1 and 305-2 both use the same wireless service provider. In this case, SMS message 312 may be routed through SMSC 116-1 but may not need to be routed through SMPP gateway 125. The receiving SMSC, such as SMSC 116-1, may recognize that the destination for user 305-2 is within the network of the wireless service provider and may therefore proceed to route the SMS message directly to user 305-2. Now assume that user 305-1 sends an SMS message 314 to user 305-3 and that users 305-1 and 305-3 use different wireless service providers. In this case, SMS message 314 may be routed through SMSC 116-1, which may recognize that SMS message 314 is intended for a user outside of the network 115, and may thus forward the message to SMPP gateway 125. Gateway 125 may then forward message 314 toward the network of the service provider to which user 305-3 subscribes.

FIGS. 4A and 4B are diagrams illustrating exemplary data structures that may be used by SMPP gateway 120 and/or MMSC gateway 125.

As shown in FIG. 4A, a data structure 410 may include a short code field 412, a destination field 414, and a billing identifier (ID) field 416. Data structure 410 may be stored, for example, in memory 210 of SMPP gateway 120 or MMSC gateway 125. Short code field 412 may be used to store a list of short codes that are available to the subscribers of network 115. Destination field 414 may include, for each short code, the actual destination corresponding to the short code. Destination field 414 may include, for example, a complete telephone number or other destination address that identifies the destination corresponding to the short code. For example, as shown in FIG. 4A, for the short code "123", destination field 414 may include the address "mms.aggregator1.com".

Billing ID field 416 may include a billing code associated with the corresponding short code field 412 and destination field 414. For example, the billing ID "10" is associated with the short code "123". Billing IDs may be used by the service provider to track how charges for a SMS or MMS message are to be billed. Each billing ID may generally represent a label that the service provider may use when billing the user that originated the message. Charges for the sending or receiving of an SMS/MMS message may vary based on the service provider, the particular end user 105 (e.g., such as based on the account or plan to which the end user subscribes), the type of content in the SMS or MMS message, and the content provider 140 that is providing the message. Different content providers 140 may charge the customer different amounts for messages. For example, a user may request a ringtone be sent to the user via an MMS message or some type of textual content be sent via an SMS message. The billing ID for the message may specify how much to charge the customer for the message and how the charge is to be allotted to other third parties, such as what portion of the charge is allotted to an artist and what portion is to be paid to the content provider 140. In short, billing IDs may be used to classify messages based on how they are to be billed to users 105. A single billing ID may be assigned to, for example, a number of different short codes/destinations.

As shown in FIG. 4B, a data structure 420 may include a destination field 422 and a billing ID field 424. Data structure 420 may be used in addition to or alternatively to data structure 410. Data structure 420 may relate destinations to billing IDs without regard to short codes.

The short codes, destinations, and billing IDs shown in FIGS. 4A and 4B may be stored in gateways 120 and/or 125. This can be advantageous, as it puts this information in a centralized location and can simplify the modification or addition of this information in system 100. In contrast, if this information were to be stored at each SMSC 116 or MMSC 117, a change or addition to this information (such as a new short code to be added) may need to propagated through many more SMSCs 110 and/or MMSCs 117. Other information, such as international dialing ranges, may be stored and used by gateway 120 and/or gateway 125 to facilitate routing messages to external network 160.

Figure 5:
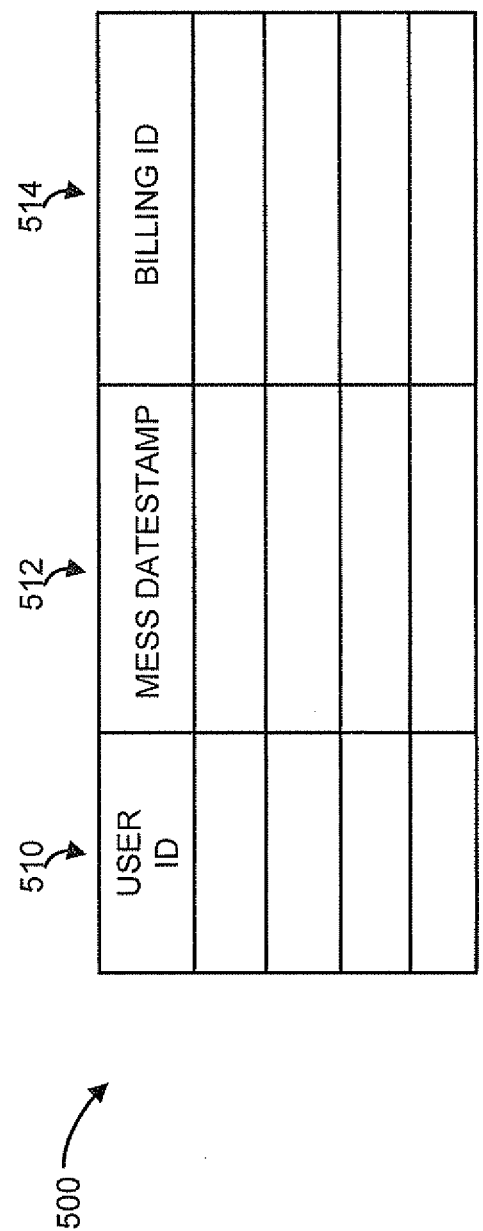
FIG. 5 is a diagram illustrating an exemplary data structure that may be used by the messaging servers shown in FIG. 1.

FIG. 5 is a diagram illustrating an exemplary data structure 500 that may be used by SMSCs 110 or MMSCs 117. Data structure 500 may generally be used to provide a record of messages sent or received by these messaging servers. Data structure 500 may be particularly used to store, for example, a record of user messages that may be used during billing, and may thus represent billing records for a user or a group of users. Three exemplary fields are shown in data structure 500: user identification (ID) field 510, message datestamp field 512, and billing identification (ID) field 514. User ID field 510 may be used to uniquely identify the user 105 to which the particular entry applies. Message datestamp field 512 may include a date and time at which the message was sent or received. Billing ID field 514 may store the billing ID associated with the message.

To preserve the gateway architecture shown in FIG. 1, the messaging servers (i.e., SMSCs 110 and/or MMSCs 117) may not normally store the billing IDs associated with the various short codes or actual destinations. Accordingly, the message server may initially simply substitute default billing IDs for billing ID field 514 in data structure 500. Consistent with aspects described herein, billing IDs for billing ID field 514 may be communicated to the messaging server by the gateway using unused fields or newly added fields in control communications that are part of the messaging protocol.

Figure 6:
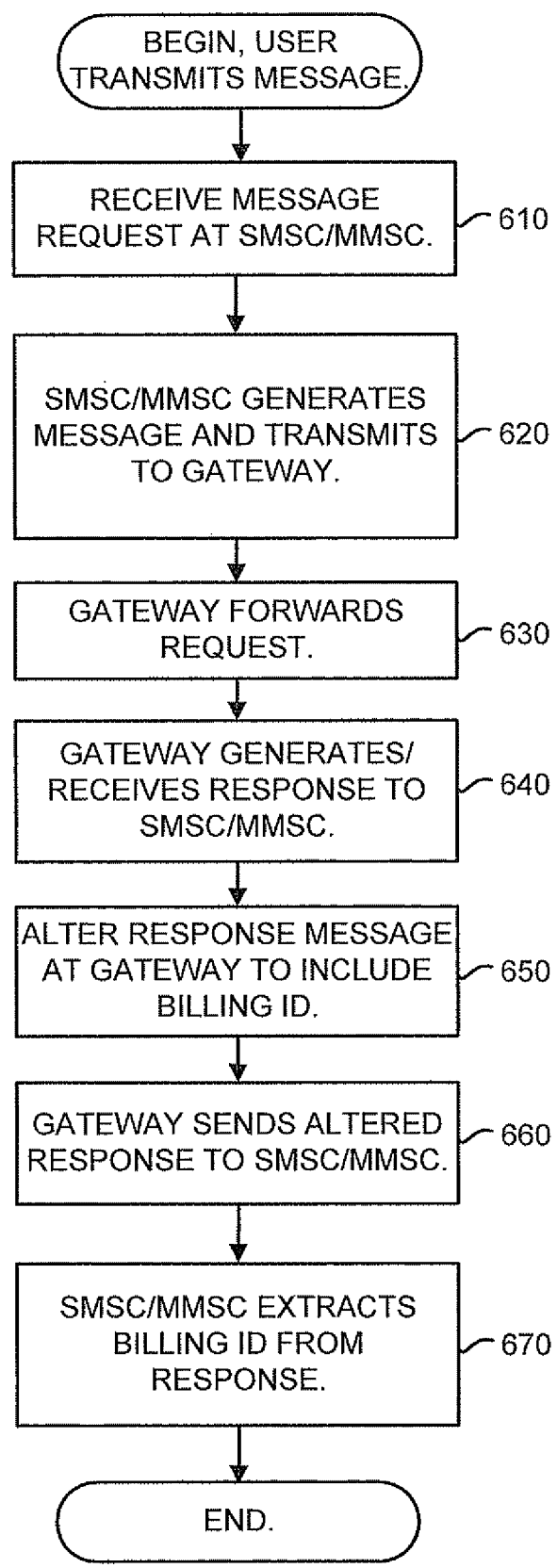
FIG. 6 is a flow chart illustrating exemplary operations performed during transmission of a user originated message.

FIG. 6 is a flow chart illustrating exemplary operations performed during transmission of a user originated message. Such a message may be sent from, for example, mobile 110-1 to content provider 140-1. The message may be addressed using either a short code or a complete destination number. The operations shown in FIG. 6 may generally operate to, among other things, notify the appropriate messaging server of the correct billing ID for the user originated message.

To begin, a user 105 may transmit a message, such as an SMS or MMS message via the user's mobile device 110-1. The message may be received at the appropriate SMSC 116 or MMSC 117 (block 610). In some implementations, different mobile devices 110 may each be serviced by SMSCs 116/MMSCs 117 that are assigned to the mobile device.

The SMSC 116/MMSC 117 may generate a SMPP request (or MMSC request message for an MMS message) as part of the SMPP protocol (block 620). The request may generally contain the message and act as a request for the message to be delivered to its intended destination. For the operations shown in FIG. 6, assume that the message is destined for a device connected to external network 160, and thus should be forwarded to gateway 120 or 125.

SMPP gateway 120 (or MMSC gateway 125 for an MMS message) may forward the request to an external message entity corresponding to the message destination (block 630). The external message entity may be, for instance, one of content aggregators 130 or content providers 140. The external message entity may be determined from the short code or complete destination associated with the message. When the destination entered by a user is a short code, SMPP gateway 120 (or MMSC gateway 125) may look up the full destination for the short code before transmitting the request message to the external message entity.

SMPP is generally a request/response based protocol, in which the entity requesting delivery of a message is not assured that the delivery has been successful until a response is received back that confirms delivery of the message.

At some point, the response corresponding to the request may be received back at gateway 120 (or MMSC gateway 125) (block 640). Alternatively, gateway 120 may generate a response to the SMSCs/MMSCs itself to indicate if the forwarding of the message was successful (block 640). The response may indicate, among other things, whether the user generated message was successfully delivered. SMPP gateway 120 (or MMSC gateway 125) may alter the response to include the billing ID corresponding to the message (block 650). The billing ID may be looked-up, or may have been previously obtained by the gateway, from data structure 410 or 420. The response may be altered in a number of ways. For instance, an unused or an unneeded field in the response message may be used for the billing ID. Alternatively, if allowed by the protocol (e.g., the SMPP protocol) a new field may be added to the response.

Figure 7:
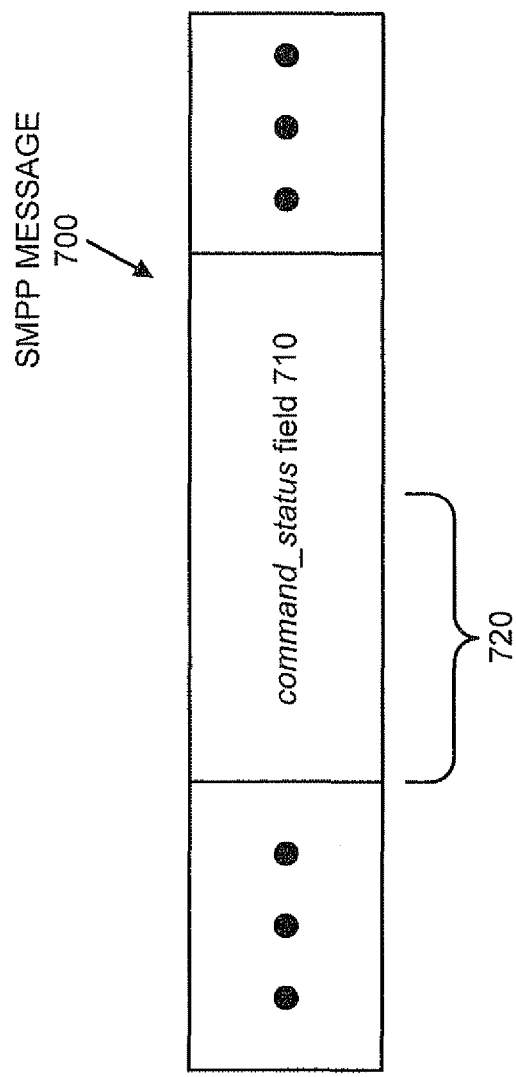
FIG. 7 is a diagram illustrating alteration of an exemplary SMPP response message to include a billing ID.

FIG. 7 is a diagram illustrating alteration of an exemplary SMPP response to include a billing ID. Response 700 may include a message that further includes a number of fields. In this example, one particular field, command_status field 710 is highlighted. Under the SMPP protocol version 3.4, the first half of the field (16 bits of this field), labeled as sub-field 720, are currently unused and are reserved. SMPP gateway 120 may write the billing ID corresponding to the response in sub-field 720. Thus, the SMPP gateway 120 may write the billing ID associated with the short code or external destination to sub-field 720. In alternate implementations, other fields or sub-fields of response 700 may be used to contain the billing ID.

Returning to FIG. 6, SMPP gateway 120 (or MMSC gateway 125) may continue to send the response to the designated one of SMSCs 116 or MMSCs 117 (block 660). The SMSC 116 or MMSC 117 may then process the response as normal, except that it may additionally extract the billing ID from the response (block 670). The billing ID may be stored and used in generating billing reports for the user that originated the message.

With the operations shown in FIG. 6, a messaging system may be implemented in a distributed gateway-based architecture in which billing information is stored at one or more gateways. In the case of a user originated message, the billing ID for the particular message may be passed back from gateway to the SMSC 116 or MMSC 117 using fields that are already part of the messaging protocol. In this manner, billing information can be stored and maintained at a relatively few number of gateways but can be distributed to the appropriate SMSC or MMSC in responses generated as part of the normal SMPP or MMS protocol.

Figure 8:
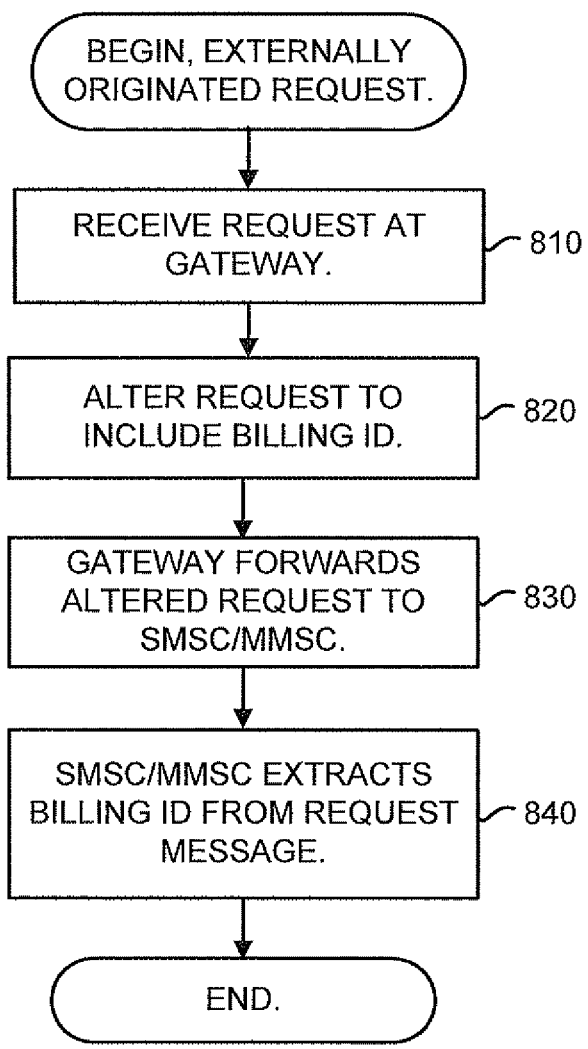
FIG. 8 is a flow chart illustrating exemplary operations performed during transmission of an externally originated message.

FIG. 8 is a flow chart illustrating exemplary operations performed during transmission of a message originating in external network 160. For instance, an SMS or MMS message may be originated by a content aggregator 130 or content provider 140. Such a message may be sent from, for example, content aggregator 130-1 to mobile device 110-1.

The sender of the message, such as content aggregator 130-1, may generate a SMPP request as part of the SMPP protocol, which may be received by gateway 120 or 125 (block 810). The request may generally contain the message and act as a request for the message to be delivered to its intended destination (e.g., one of mobile devices 110).

SMPP gateway 120 (or MMSC gateway 125 for an MMS message) may receive the request and alter the request to include the billing ID (block 820). The billing ID may be a billing ID determined for the message based on, for example, the sender of the message or based on other information that indicates how the message is to be billed. The request may be altered in a number of ways. For instance, an unused or an unneeded field in the response may be used for the billing ID. Alternatively, if allowed by the protocol (e.g., the SMPP protocol) a new field may be added to the request.

SMPP gateway 120 (or MMSC gateway 125) may forward the request to the designated one of SMSCs 116 or MMSCs 117 (block 830). The SMSC 116 or MMSC 117 may then process the request as normal, except that it may additionally extract the billing ID from the message (block 840). The billing ID may be stored and used in generating billing reports for the user that originated the message.

With the operations shown in FIG. 8, a messaging system may be implemented in a distributed gateway-based architecture in which billing information is stored at one or more gateways. In the case of an externally originated message, a billing ID for the message may be forwarded from gateway to the SMSC 116 or MMSC 117 using fields that are already part of the messaging protocol.

The foregoing description of implementations provides illustration, but is not intended to be exhaustive or to limit the implementations to the precise form disclosed.

The term "may" is used throughout this application and is intended to be interpreted, for example, as "having the potential to," "configured to," or "being able to", and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 6 and 8, the order of the blocks may be modified in other implementations. Further, non-dependent blocks may be performed in parallel.

It will be apparent that the device(s) described herein may be implemented in many different forms of software, firmware, and hardware in the implementations illustrated in the figures. The actual software code or specialized control hardware used to implement these concepts does not limit the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
   receiving, at a messaging server in a service provider network, a message, the message being associated with a message delivery protocol, the message delivery protocol being one of: a Short Message Peer-to-Peer (SMPP) delivery protocol, or a Multimedia Message Service (MMS) delivery protocol;
   transmitting, by the messaging server and to a messaging gateway of the service provider network, a request to deliver the message to a device external to the service provider network;
   receiving, by the messaging server and from the messaging gateway, a response to the request to deliver the message, the response being generated by the device external to the service provider network, the response indicating whether the message was successfully delivered, the response including a billing identifier describing how the message should be billed, and the billing identifier being inserted into the response by the messaging gateway;
   extracting, by the messaging server, the billing identifier from the response received from the gateway; and
   storing, by the messaging server, the billing identifier as part of a billing record.

2. The method of claim 1, where the messaging server includes a Short Message Service Center (SMSC) or a Multimedia Message Service Center (MMSC).

3. The method of claim 1, where the message is a Simple Message Service (SMS) message or a Multimedia Message Service (MMS) message.

4. The method of claim 1, where the request and the response are based on the message delivery protocol and the billing identifier is included in a field of the response that would normally not be used in the message delivery protocol.

5. The method of claim 1, where the request and the response are based on the message delivery protocol and the billing identifier is included in a field of the response that would normally not be present in the message delivery protocol.

6. A method comprising:
   receiving, at a messaging gateway in a service provider network, a communication that is part of a messaging protocol for delivering a text message or a multimedia message to a user device, the messaging protocol being a Short Message Peer-to-Peer (SMPP) delivery protocol or a Multimedia Message Service (MMS) delivery protocol, and the communication being a response, generated by a device external to the service provider network, to a request, by a messaging server in the service provider network, to deliver the text message or the multimedia message to the device external to the service provider network, the response indicating whether the text message or the multimedia message was successfully delivered;
   altering, by the messaging gateway, the communication to include a billing identifier describing how the text message or the multimedia message should be billed;
   and transmitting, by the messaging gateway, the altered communication to the messaging server, the messaging server being to deliver the text message or the multimedia message to the user device.

7. The method of claim 6, where the messaging server includes a Short Message Service Center (SMSC) or a Multimedia Message Service Center (MMSC).

8. The method of claim 6, where the text message or the multimedia message includes a Simple Message Service (SMS) message or a Multimedia Message Service (MMS) message.

9. The method of claim 6, where the billing identifier is included in a field of the communication that would normally not be used in the messaging protocol.

10. The method of claim 6, where the billing identifier is included in a field of the message that would normally not be present in the messaging protocol.

11. The method of claim 6, further comprising: locating the billing identifier in a data structure based on a short code or destination information of the text message or the multimedia message.

12. A system comprising: at least one gateway of a service provider network to:
    receive, from a messaging server in a service provider network, a request to deliver a message to a device external to the service provider network, the message being associated with a message delivery protocol, the message delivery protocol being one of: a Short Message Peer-to-Peer (SMPP) delivery protocol, or a Multimedia Message Service (MMS) delivery protocol;
    forward the request to the device;
    receive, from the device, a response to the request, the response indicating whether the message was successfully delivered;
    alter the received response by inserting a billing identifier, describing how the message should be billed, into the response;
    transmit the response to the messaging server for extraction of the billing identifier.

13. The system of claim 12, where the messaging server includes a Short Message Service Center (SMSC) or a Multimedia Message Service Center (MMSC).

14. The system of claim 12, where the billing identifier is included in a field of the response that would normally not be used in the messaging protocol.

15. The system of claim 12, where the billing identifier is included in a field of the communications that would normally not be present in the messaging protocol.

16. A non-transitory computer-readable medium containing instructions, the instructions including:
    one or more instructions which, when executed by at least one processor of a messaging gateway in a service provider network, cause the at least one processor to receive a communication that is communicated based on a messaging protocol for delivering at least one of text messages or multimedia messages to user devices, the messaging protocol being a Short Message Peer-to-Peer (SMPP) delivery protocol or a Multimedia Message Service (MMS) delivery protocol, and the communication being a response, generated by a device external to the service provider network, to a request by a messaging server, in the service provider network, to deliver the at least one of the text messages or the multimedia messages to the device external to the service provider network, the response indicating whether the at least one of the text messages or the multimedia messages were successfully delivered;

one or more instructions which, when executed by the at least one processor of the messaging gateway, cause the at least one processor to alter the communication to include a billing identifier describing how the text or multimedia message should be billed; and one or more instructions which, when executed by the at least one processor of the messaging gateway, cause the at least one processor to transmit the altered communication to the messaging server used in the delivering of the text or multimedia message to the user devices.

17. The non-transitory computer-readable medium of claim 16, where the messaging server includes a Short Message Service Center (SMSC) or a Multimedia Message Service Center (MMSC).

18. The non-transitory computer-readable medium of claim 16, where the text messages are Simple Message Service (SMS) messages and the multimedia messages are Multimedia Message Service (MMS) messages.

19. The non-transitory computer-readable medium of claim 16, where the billing identifier is included in a field of the communication that would normally not be used in the messaging protocol.

20. The non-transitory computer-readable medium of claim 16, further comprising: one or more instructions to locate the billing identifier in a data structure based on a short code or destination information of the at least one of text messages or the multimedia messages.

21. The method of claim 1, further comprising: locating the billing identifier in a data structure based on a short code or destination information of the message.

22. The system of claim 12, where the at least one gateway is further to: locate the billing identifier in a data structure based on a short code or destination information of the message.

* * * * *